United States Patent
Pedersen

(10) Patent No.: US 6,741,249 B1
(45) Date of Patent: May 25, 2004

(54) METHOD AND SYSTEM FOR GENERATING SUBDIVISION SURFACES IN REAL-TIME

(75) Inventor: Morten Pedersen, Surrey (GB)

(73) Assignee: Electronics Arts, Inc., Redwood City, CA (US)

( * ) Notice: Subject to any disclaimer, the term of this patent is extended or adjusted under 35 U.S.C. 154(b) by 82 days.

(21) Appl. No.: 10/104,623

(22) Filed: Mar. 20, 2002

(51) Int. Cl.[7] .............................................. G06T 17/00
(52) U.S. Cl. ...................................................... 345/423
(58) Field of Search ................................ 345/420, 419, 345/421, 423, 428

(56) References Cited

U.S. PATENT DOCUMENTS

| | | | |
|---|---|---|---|
| 6,525,727 B1 * | 2/2003 | Junkins et al. | 345/423 |
| 6,563,501 B2 * | 5/2003 | Sfarti | 345/442 |
| 6,603,473 B1 * | 8/2003 | Litke et al. | 345/420 |
| 6,606,584 B1 * | 8/2003 | Junkins | 703/1 |
| 6,618,049 B1 * | 9/2003 | Hansen | 345/423 |

OTHER PUBLICATIONS

Web page, Sharp, B., "Subdivision Surface Theory," at URL=http://www.gamasutra.com/features/20000411/sharp_01.htm, 13 pages (Apr. 11, 2000), printed Aug. 13, 2001.

Web page, Sharp, B., "Implementing Subdivision Surface Theory," at URL=http://www.gamasutra.com/features/20000425/sharp.htm, 11 pages (Apr. 25,2000), printed Aug. 13, 2001.

Web page, Sharp, B., "Implementing Curved Surface Geometry," at URL=http://www.gamasutra.com/features/20000530/sharp_01.htm, 14 pages (May 30,2000), printed Aug. 13, 2001.

\* cited by examiner

*Primary Examiner*—Mark Zimmermann
*Assistant Examiner*—Huedung X. Cao
(74) *Attorney, Agent, or Firm*—Horace H. Ng; Townsend and Townsend and Crew, LLP

(57) ABSTRACT

A method for generating subdivision surfaces in real-time for use in connection with computer graphics is provided. According to an exemplary embodiment of the method, face information and subdivision data for a subdivided face are generated. The subdivided face is made up of a number of subdivision surfaces. The face information and subdivision data for the subdivided face respectively include vertices and edges, which define the subdivided face. Furthermore, two bitflags are associated with each edge identified in the subdivision data for the subdivided face. One bitflag is used to identify whether the associated edge is being used for a second time and the other bitflag is used to indicate whether the associated edge is used twice. The subdivision data for the subdivided face is then used to generate subdivided and additional edges. Each edge identified by the subdivision data for the subdivided face is defined by a pair of subdivided edges. If an edge is used twice and is being used for the second time, the order of the subdivided edges which make up the edge is reversed. The face information for a subdivision surface is then generated using the face information and subdivision data for the subdivided face, and the subdivision data for the subdivision surface is generated using the subdivided and additional edges. Similarly, the face information and subdivision data for the subdivision surface respectively include vertices and edges, which define the subdivision surface; and two bitflags are associated with each edge identified in the subdivision data for the subdivision surface. After the respective face information and subdivision data for the subdivided face and subdivision surfaces are generated, new vertices are created for each edge which defines the subdivided face. An interior vertex bitflag is used to indicate whether a newly created vertex is an interior vertex. If the new vertex is an interior vertex, then using a standard (⅜,⅜,⅛,⅛) vertex weighting system, the blending weight for an edge-sharing neighbor vertex is halved. All the vertices are then displaced to create a smoother subdivided face.

40 Claims, 7 Drawing Sheets

| Vertex Interior | Edge Doublesided | Blending weight |
|---|---|---|
| No | No | 1/8 = 0.125 |
| No | Yes | 0/8 = 0.0 |
| Yes | No | (impossible) |
| Yes | Yes | 1/1 = 0.0625 |

METHOD AND SYSTEM FOR GENERATING SUBDIVISION SURFACES IN REAL-TIME

BACKGROUND OF THE INVENTION

The present invention generally relates to computer graphics processing. More specifically, the present invention relates to a method and system for generating subdivision surfaces in real-time for use in connection with computer graphics.

Subdivision surfaces are used to create smooth geometric surfaces. A subdivision surface is generated through subdivision. Every subdivision surface starts with an original polygonal surface. The original polygonal surface is subdivided into additional polygons and all the vertices are moved according to some set of rules. The rules for moving the vertices vary from scheme to scheme. Some rules, for example, involve keeping the old vertices around, optionally moving them, and introducing new vertices.

One of the schemes that is commonly used is the loop surface subdivision scheme. The loop surface subdivision scheme works by generating and inserting extra vertices and then displacing the original vertices by predefined weighting constants. The subdivision surface is gradually smoothed with every subdivision step. The extra vertices are generated based on the original vertices and are inserted in the middle of edges defined by each pair of original vertices. Each existing vertex is influenced by other vertices it is connected to, as additional detailed geometry through subdivision is recursively generated. In addition to the loop surface subdivision scheme, a number of other schemes, such as the polyhedral scheme, are available to be used to generate subdivision surfaces.

Subdivision surfaces are used regularly in the computer graphics industry, most notably, for animated films or productions. However, due to expensive processing and overhead costs, use of subdivision surfaces has almost exclusively been limited to non real-time applications, such as graphic art packages and movie/television production.

One scheme has been introduced to attempt to generate subdivision surfaces in real-time. Such scheme works by administering a large complex database of geometry pointers and edges which are used to create the subdivided primitive. The use of a large complex database leads to large code size and many processing inefficiencies. Hence, it would be desirable to provide an improved method and system which is capable of generating subdivision surfaces in a more efficient manner so as to allow such subdivision surfaces to be implemented and utilized in real-time.

SUMMARY OF THE INVENTION

A method and system for generating subdivision surfaces in real-time for use in connection with computer graphics is provided. According to an exemplary embodiment of the present invention, face information and subdivision data for a subdivided face are first generated. The subdivided face is made up of a number of subdivision surfaces. The face information and subdivision data for the subdivided face respectively include vertices and edges, which define the subdivided face. Furthermore, two bitflags are associated with each edge identified in the subdivision data for the subdivided face. One bitflag is used to identify whether the associated edge is being used for a second time and the other bitflag is used to indicate whether the associated edge is used twice.

The subdivision data for the subdivided face is then used to generate subdivided and additional edges. Each edge identified by the subdivision data for the subdivided face is defined by a pair of subdivided edges. If an edge is used twice and is being used for the second time, the order of the subdivided edges which make up the edge is reversed. The face information for a subdivision surface is then generated using the face information and subdivision data for the subdivided face following a first predetermined methodology. The subdivision data for the subdivision surface is generated using the subdivided and additional edges following a second predetermined methodology. Similarly, the face information and subdivision data for the subdivision surface respectively include vertices and edges, which define the subdivision surface; and two bitflags are associated with each edge identified in the subdivision data for the subdivision surface.

After the respective face information and subdivision data for the subdivided face and subdivision surfaces are generated, new vertices are created for each edge which defines the subdivided face. An interior vertex bitflag is used to indicate whether a newly created vertex is an interior vertex. If the new vertex is an interior vertex, then using a standard ($3/8, 3/8, 1/8, 1/8$) vertex weighting system, the blending weight for an edge-sharing neighbor vertex is halved. All the vertices are then displaced to create a smoother subdivided face.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of various exemplary embodiments will now be described. The present invention generally relates to an improved method for generating subdivision surfaces in a real-time manner. According to an exemplary embodiment, the method uses a number of indexed primitives. These primitives include an array of vertices, an array of faces indexing into these vertices, and subdivision data. The subdivision data includes, amongst other information, description of edges defined by a pair of vertices, number of vertices, number of faces, and number of unique edges. Details with respect to how these primitives are derived and how they are used to generate subdivision surfaces will be described further below.

Every subdivision surface begins with an original polygonal surface. One or more original polygonal surfaces make up an object for which a graphical model is to be created. The graphical model is a graphical representation of the object. Each original polygonal surface is subdivided into additional polygonals or subdivision surfaces. Each subdivision surface may then be treated like an original polygonal surface and be further subdivided into yet more subdivision surfaces, if desired. The number of subdivisions to be undertaken depends on a number of factors including, for example, design choice.

Figure 1:
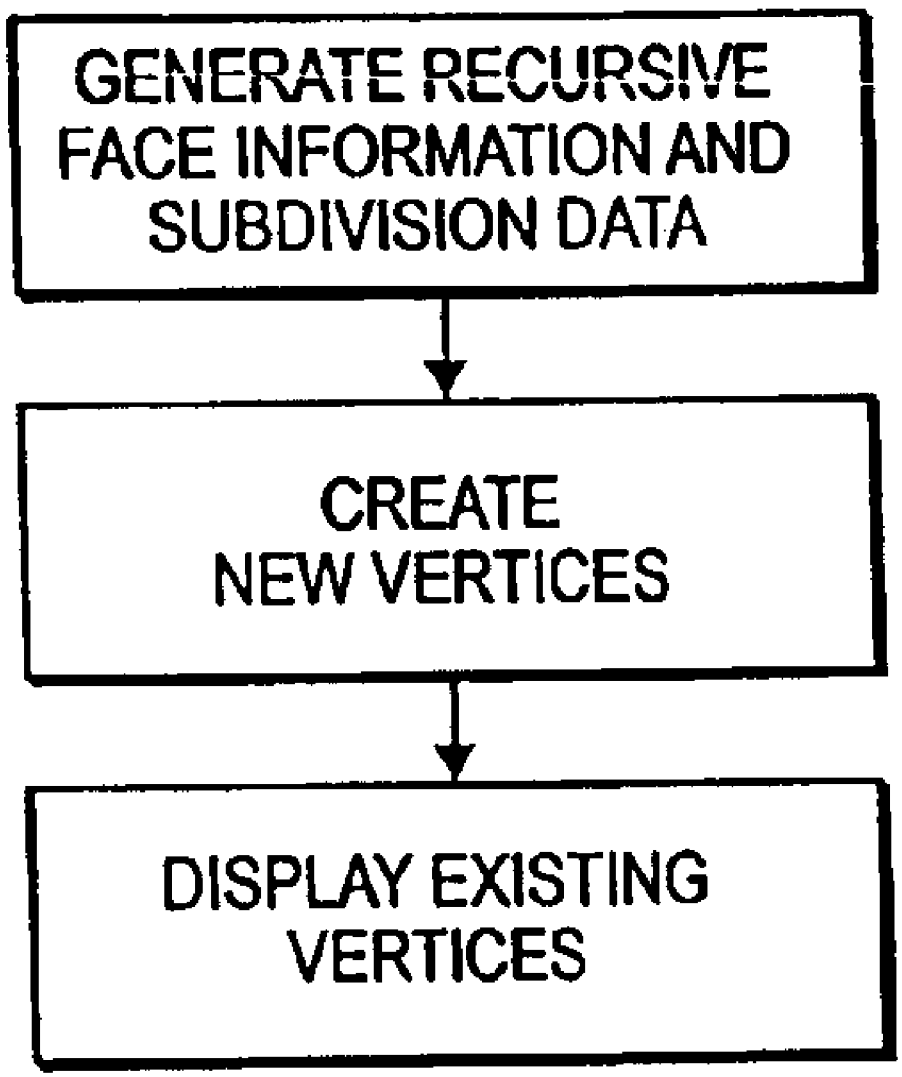
FIG. 1 is a flow diagram illustrating steps to be taken to generate subdivision surfaces in accordance with one exemplary method of the present invention.

According to an exemplary embodiment, the method of the present invention goes through three steps to generate subdivision surfaces. Referring to FIG. 1, the three steps of the exemplary method involves (1) generating recursive face information, (2) creating new vertices, and (3) displacing existing vertices. Each of these three steps will be described in further detail below.

Figure 2:
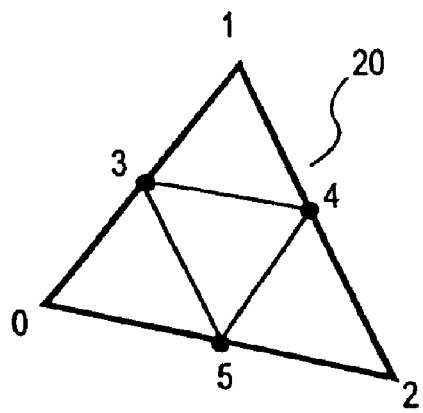
FIG. 2 is a diagram showing an original polygonal surface (or a subdivision surface) having a triangular shape to be subdivided according to one exemplary method of the present invention.

When generating recursive face information, face information is generated for each surface or face to be subdivided. According to an exemplary embodiment, each original polygonal surface assumes a triangular shape, i.e. each face to be subdivided assumes a triangular shape. Consequently, as will be shown below, all subdivision surfaces which are generated after each subdivision step also assume a triangular shape. FIG. 2 shows an original polygonal surface (or a subdivision surface) 20 having a triangular shape which is to be subdivided. The surface or face 20 is defined by three vertices (0,1,2). That is, the face 20 is formed by three unique edges connecting the three vertices (0,1,2), namely, the edge delimited by the pair of vertices (0,1), the edge delimited by the pair of vertices (1,2) and the edge delimited by the pair of vertices (2,0). A unique edge is defined as an edge formed by connecting two and only two vertices, i.e., an edge delimited by a pair of vertices.

For each subdivision step, additional vertices are added to the three edges forming the face 20. More specifically, an additional vertex is added to the middle of each existing edge. As shown in FIG. 2, new vertices (3,4,5) are added to the edge defined by the pair of vertices (0,1), the edge defined by the pair of vertices (1,2) and the edge defined by the pair of vertices (2,0), respectively. The reference numbers (3,4,5) can also be used to reference the edge which contain the new vertices respectively. For example, reference number (3) can be used to reference the edge between vertices (0,1); reference number (4) can be used to reference the edge between vertices (1,2), and reference number (5) can be used to reference the edge between vertices (2,0).

During each subdivision step, each existing edge of the face 20 is broken into two subdivided edges. For example, as shown in FIG. 2, the edge (3) is broken into two equal subdivided edges, namely, the subdivided edge between vertices (0,3) and subdivided edge between vertices (3,1); similarly, edges (4) and (5) are also each broken into two equal subdivided edges.

In addition, during each subdivision step, three new additional edges are created in the middle of the face 20 using the newly created vertices (3,4,5). As shown in FIG. 2, the new additional edges are: additional edge between vertices (3,5), additional edge between vertices (3,4) and additional edge between vertices (4,5). These additional edges, in turn, are then used to subdivide the face 20 thereby generating additional subdivision surfaces. Referring to FIG. 2, for the face 20, four subdivision surfaces are generated as defined by vertices (3,1,4), (4,2,5), (5,0,3) and (3,4,5) respectively.

As described above, each subdivision step increases the number of faces, vertices and edges. By using a triangular surface, such as the face 20, the number of faces increases fourfold as each subdivision step generates four new faces for each existing face. The number of faces is represented by the following equation: $Faces_{n+1} = Faces_n * 4$, where "n" represents the $n^{th}$ subdivision step and "n+1" represents the subdivision step immediately following the $n^{th}$ subdivision step.

The number of vertices increases by the number of unique edges. This is because additional vertices are generated in the middle of each of the unique edges. The following equation represents the number of vertices after the n+1$^{th}$ subdivision step: $Vertices_{n+1} = Vertices_n + Edges_n$.

As a new vertex is added in the middle of a unique edge, this new vertex is connected to other new vertices to form additional unique edges. The following equation represents the number of unique edges after the n+1$^{th}$ subdivision step: $Edges_{n+1} = Edges_n * 2 + Faces_n * 3$.

Furthermore, according to an exemplary method, no more than two faces can be connected to the same unique edge, i.e., a unique edge at most can only be shared or used by two faces. The use of the same edge by two faces is to follow a certain order, which will be described further below. In order to keep track of the status of each edge, two face bitflags are associated with each edge forming the face 20. The first face bitflag is used to indicate whether the associated edge is an "edge recycle," i.e., whether that associated edge is being used for a second time. The second face bitflag is used to indicate whether the associated edge is "doublesided," i.e., whether that associated edge is included or shared by multiple faces. In addition, as will be described further below, there is an interior vertex bitflag associated with each edge which is to be subdivided. When an edge is subdivided, a new vertex located in the middle of the edge is also created. The interior vertex bitflag is used to indicate whether the newly created vertex is an "interior" vertex. The use of these bitflags will be described further below. With respect to implementation of these bitflags, they are typically implemented using software and are used as lookup pointers into weighting tables.

To briefly summarize, referring back to FIG. 2, when the face 20 is to be subdivided, the following face information and subdivision data are generated for the face 20 to be subdivided:

Face$_0$ [0]: vertices (0,1,2) and

Sub$_0$ [0]: (3,4,5)

Face$_0$ [0]: vertices (0,1,2) represents the face 20 as defined by vertices (0,1,2); sub$_0$ 0: (3,4,5) represents the three edges which define the face 20. Edge (3) is between vertices (0,1); edge (4) is between vertices (1,2); and edge (5) is between vertices (2,0).

Subdividing the face 20 generates vertex (3) between vertices (0,1), vertex (4) between vertices (1,2) and vertex (5) between vertices (2,0). Generation of vertices will be described further below. In addition, since the face 20 is subdivided into four subdivision surfaces, additional face information is generated. For example, continuing with FIG. 2, subdividing the face 20 generates the following face information:

Face$_1$ [0]: vertices (3,1,4)—sub element 0, face element 1, sub element 1

Face$_1$ [1]: vertices (4,2,5)—sub element 1, face element 2, sub element 2

Face$_1$ [2]: vertices (5,0,3)—sub element 2, face element 0, sub element 0

Face$_1$ [3]: vertices (3,4,5)—sub element 0, sub element 1, sub element 2

Face$_1$ [0]: vertices (3,1,4) represents a subdivision surface defined by vertices (3,1,4); Face$_1$ [1]: vertices (4,2,5) represents a second subdivision surface defined by vertices (4,2,5); Face$_1$ [2]: vertices (5,0,3) represents a third subdivision surface defined by vertices (5,0,3); and Face$_1$ [3]: vertices (3,4,5) represents a fourth subdivision surface defined by vertices (3,4,5).

The information to the right of the face information generated after the subdivision indicates the elements from the pre-subdivision face information and subdivision data which are used to generate the post-subdivision face information. For example, to construct Face$_1$ [0], the first element of the subdivision data Sub$_0$ [0], edge (3), the second element of the face information Face$_0$ [0], (1), and the second element of the subdivision data Sub$_0$ [0], edge (4), are used, resulting in (3,1,4); to construct Face$_1$ 1, the second element of the subdivision data Sub$_0$ [0], edge (4), the third element of the face information Face$_0$ [0], (2), and the third element of the subdivision data Sub$_0$ [0], edge (5), are used, resulting in (4,2,5). It should be noted that sub element 0 represents the first sub element; beginning of the elements starts with "0". Likewise, Face$_1$ [2] and Face$_1$ [3] are constructed the same way.

For each subdivision step, the face information for each face 20 as described above is generated. If additional subdivision step(s) are to be undertaken, i.e., the subdivision surfaces generated from the originally subdivided surface are to be further subdivided, then face information and subdivision data for each of the subdivision surface to be subdivided will have to be generated as described above.

Figure 3:
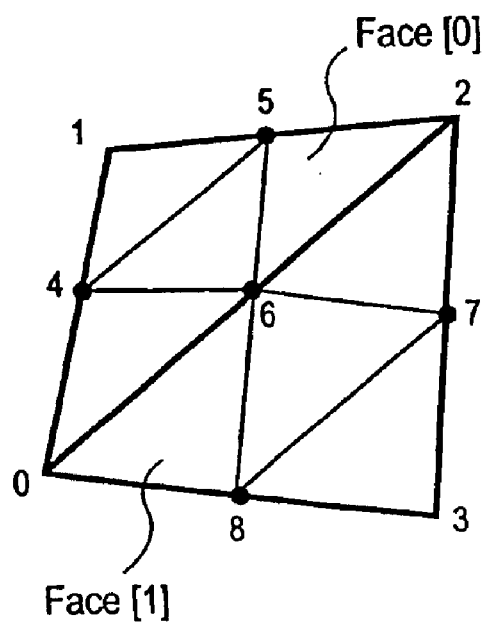
FIG. 3 is a diagram illustrating use of an edge by two faces in accordance with an exemplary method of the present invention.

The use of the first face bitflags will now be described. As mentioned above, the first face bitflag is used to indicate whether an edge is being used for a second time ("edge recycle"). If the edge is being used for a second time, then the edge is to be used in a reverse order this second time around. FIG. 3 is a diagram illustrating use of an edge by two faces. Referring to FIG. 3, there are two faces defined by vertices (0,1,2,3). The first face, Face [0], is defined by vertices (0,1,2) and the second face, Face [1], is defined by vertices (0,2,3). Edge (6) is the edge between vertices (0,2). As shown in FIG. 3, edge (6) is shared or used by both Face [0] and Face [1]. According to an exemplary method, assuming a clockwise direction, edge (6) is used by Face [1] in the order from vertex (2) to vertex (0). In Face [1], this order is reversed, i.e., edge (6) is used by Face [1] in the order from vertex (0) to vertex (2). Likewise, vertex (6) is shared by the subdivided face output from both Face [0] and Face [1]. To vertex (6), vertices (0,2) are considered to be neighbors as vertex (6) is on the edge between vertices (0,2), and vertices (1,3) are considered to be opposites.

An edge recycle is indicated by the letter "r" added to the subdivision data element. An edge doublesided is indicated by the letter "d" added to the subdivision data element. The edge doublesided will be further described below.

Based on FIG. 3, the following face information is obtained for Face [0] and Face [1]:

Face$_0$ [0]: vertices (0,1,2)—sub$_0$ [0]: (4,5,6$_d$) and

Face$_0$ [1]: vertices (0,2,3)—sub$_0$ [1]: (6$_{r,d}$,7,8)

Face$_0$ [0]: vertices (0,1,2) represents the three vertices (0,1,2) which make up Face [0]. Sub$_0$ [0]: (4,5,6$_d$) represents the three edges (4,5,6) which define Face [1]; the "6$_{r,d}$" indicates that edge (6) is used twice.

Face$_0$ [1]: vertices (0,2,3) represents the three vertices (0,2,3) which make up Face [1]. sub$_0$ [1]: (6$_{r,d}$,7,8) represents the three edges (6,7,8) which define Face [1]; the "6$_{r,d}$" indicates that edge (6) is used twice (i.e., shared by two faces) and that it is being used for a second time.

Figure 4:
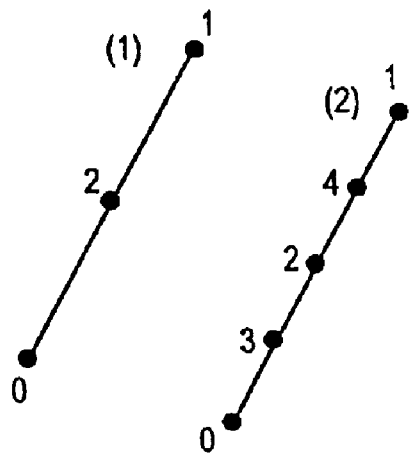
FIG. 4 is a diagram illustrating subdivision of an edge in accordance with an exemplary method of the present invention.

As mentioned above, the number of edges generated by the next subdivision follows the equation: Edges$_{n+1}$= Edges$_n$* 2+Faces$_n$*3. Subdividing one edge generates two subdivided edges with a vertex connecting them in the middle. A second subdivision then results in a total of four subdivided edges and three vertices. Referring to FIG. 4, there is a shown an edge formed between vertices (0,1). After subdividing this edge, a new vertex (2) and two subdivided edges formed between vertices (0,2) and (2,1) respectively are created. Subdividing the two subdivided edges formed between vertices (0,2) and (2,1) further creates two more new vertices (3,4) and four new subdivided edges formed between vertices (0,3), (3,2), (2,4) and (4,1) respectively. It should be noted that after subdividing an edge, the vertex pairs used to describe the two subdivided edges are kept in the following order, namely, for the first subdivided edge, the new vertex is the second vertex of the vertex pair; for the second subdivided edge, the new vertex is the first vertex of the vertex pair. For example, in FIG. 3, the two subdivided edges formed from the edge between vertices (0,1) have the following vertex pairs: (0,2) and (2,1) respectively, with vertex (2) being the newly created vertex.

Figure 5:
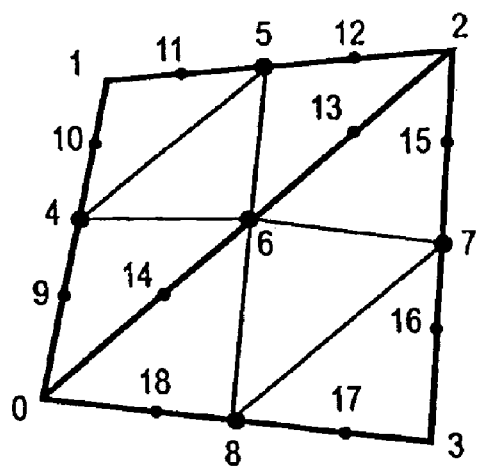
FIG. 5 is a diagram illustrating results of subdivision of two faces as shown in FIG. 3.

The subdivided edges are then added to the existing edges in the same order. FIG. 5 illustrates the results of the subdivision of Face [0] and Face [1] as shown in FIG. 3. As shown in FIG. 5, edge (4) becomes two subdivided edges (9) and (10) after subdivision; edge (5) becomes subdivided edges (11) and (12); and edge (6) becomes subdivided edges (13) and (14) and so on. As described above, subdividing an edge also results in generation of a new vertex which is added in the middle of the edge connecting the two subdivided edges. For example, when edge (4) is subdivided, new vertex (4) is created and added to the middle of the edge between vertices (0,1) thereby connecting subdivided edges (9) and (10). By indexing the edges this way, the newly created vertices are added after existing ones and the two subdivided edge indices for a given subdivided edge of an edge can be calculated by multiplying the existing edge by two and adding an offset.

Referring to FIG. 5, the two faces, Face [0] and Face [1], described by the subdivided edges (s.e.) are as follows:

Face [0]: vertices (0,1,2)—sub (4,5,6$_d$)—s.e. (9,10), (11, 12), (13$_d$,14$_d$)

Face [1]: vertices (0,2,3)—sub (6$_{r,d}$,7,8)—s.e. (14$_{r,d}$,13$_{r,d}$), (15,16), (17,18)

With respect to Face [0], vertices (0,1,2) and sub (4,5,6$_d$) have been explained above; s.e. (9,10), (11,12), (13$_d$,14$_d$) identifies all the subdivided edges resulting from subdivision of Face [0]. The subdivided edges are numbered sequentially in a clockwise direction. Each edge identified in the subdivision data for Face [0] is defined by a pair of subdivided edges. For example, edge (4) is defined by s.e. (9,10). Similarly, ($13_d,14_d$) indicates that subdivided edges (13) and (14) are used twice (i.e., shared by two faces). This follows from the fact that subdivided edges (13) and (14) make up edge (6) and edge (6), as previously described above, is used twice. Likewise, with respect to Face [1], vertices (0,2,3) and sub ($6_{r,d}$,7,8) have been explained above; s.e. ($14_{r,d},13_{r,d}$), (15,16), (17,18) identify a subdivided edges resulting from subdivision of Face [1]. ($14_{r,d}$, $13_{r,d}$) indicates that subdivided edges (13) and (14) are used twice (i.e., shared by two faces) and that they are being used a second time. Again, the subdivided edges are numbered sequentially in a clockwise direction. Furthermore, the order of the subdivided edges which make up a shared edge is reversed. This is a result of an edge being used for the second time. For example, with respect to Face [1], the subdivided edge (13) and (14) are stored as s.e. ($14_{r,d},13_{r,d}$), as opposed to s.e. ($13_d,14_d$).

Figure 6:
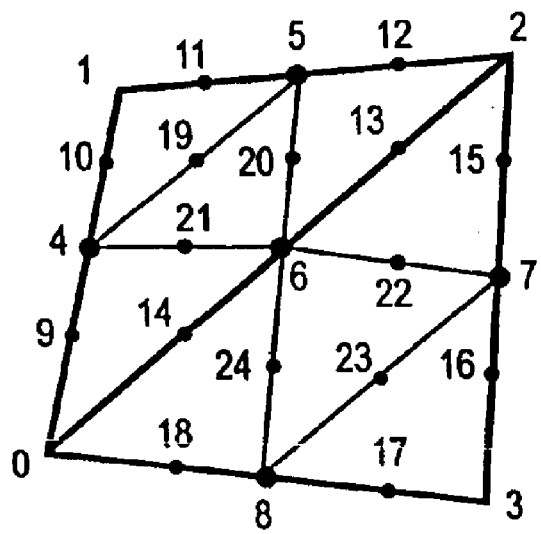
FIG. 6 is a diagram illustrating results of subdivision of two faces as shown in FIG. 3 and further illustrating additional edges added to the subdivided faces.

Furthermore, after the subdivided edges are created, additional edges are added to each subdivided face. For each subdivided face, the additional edges which are associated with that subdivided face are not used by any faces outside of the subdivision faces generated out of that subdivided face, i.e., the additional edges associated with a subdivided face are only used by subdivision faces generated out of that subdivided face. Referring to FIG. 6, the additional edges are (19,20,21,22,23,24). Each of the two faces, Face [0] and Face [1], subdivides into four subdivision faces. The fourth subdivision faces for Face [0] and Face [1] are defined by additional edges (19,20,21) and (22,23,24) respectively. As shown in FIG. 6, additional edges (19,20,21) are only used by subdivision faces generated from subdividing Face [0]; likewise, additional edges (22,23,24) are only used by subdivision faces generated from subdividing Face [1].

As shown above, before the first subdivision of Face [0] and Face [1], the following face information and subdivision data are available:

$Face_0$ [0]: vertices (0,1,2)—sub ($4,5,6_d$)
$Face_0$ [1]: vertices (0,2,3)—sub ($6_{r,d}$,7,8)

After the first subdivision of Face [0] and Face [1], the following face information and subdivision data are generated:

$Face_1$ [0]: vertices (4,1,5)—sub ($10,11,19_d$)
$Face_1$ [1]: vertices (5,2,6)—sub ($12,13_d,20_d$)
$Face_1$ [2]: vertices (6,0,4)—sub ($14_d,9,21_d$)
$Face_1$ [3]: vertices (4,5,6)—sub ($19_{r,d},20_{r,d},21_{r,d}$)
$Face_1$ [4]: vertices (6,2,7)—sub ($13_{r,d},15,22_d$)
$Face_1$ [5]: vertices (7,3,8)—sub ($16,17,23_d$)
$Face_1$ [6]: vertices (8,0,6)—sub ($18,14_{r,d},24_d$)
$Face_1$ [7]: vertices (6,7,8)—sub ($22_{r,d},23_{r,d},24_{r,d}$)

The notations used for "edge recycle" and "edge doublesided" are described above. Referring to FIG. 6, with respect to face information relating to Face [0], it can be seen that subdivided edges (13) and (14) and additional edges (19), (20) and (21) are all used twice; more specifically, subdivided edges (13) and (14) are used by both Face [0] and Face [1] and additional edges (19), (20) and (21) are used twice amongst the four subdivision faces generated from subdividing Face [0]. In addition, the face information relating to Face [0] also shows where additional edges (19), (20) and (21) are being used for the second time as indicated by the notation "r,d".

Likewise, with respect to face information relating to Face [1], it can be seen that subdivided edges (13) and (14) and additional edges (22), (23) and (24) are used twice and it is also shown where they are being used for the second time.

The face information and subdivision data for $Face_1$ [0]–$Face_1$ [3] are generated as follows. With respect to face information for $Face_1$ [0]–$Face_1$ [3], as described above, this information can be derived from face information and subdivision data for $Face_0$ [0], namely, vertices (0,1,2)—sub ($4,5,6_d$). Using the method described above, $Face_1$ [0] is derived from sub element 0, (4), face element 1, (1), and sub element 1, (5), thereby resulting in $Face_1$ [0]: vertices (4,1,5). Similarly, face information for $Face_1$ [1]–$Face_1$ [3] can be derived as described above, resulting in $Face_1$ [1]: vertices (5,2,6), $Face_1$ [2]: vertices (6,0,4), and $Face_1$ [3]: vertices (4,5,6).

The subdivision data which are generated after the first subdivision can be constructed based on the subdivided edges (s.e.) and additional edges (a.e.) as follows. To illustrate as an example, the face information and subdivision data from $Face_0$ [0] is used to generate face information and subdivision data for $Face_1$ [0], $Face_1$ [1], $Face_1$ [2] and $Face_1$ [3]. As shown above, the following data is available before the first subdivision:

$Face_0$ [0]: vertices (0,1,2)—sub ($4,5,6_d$)—s.e. (9,10), (11, 12), ($13_d,14_d$)—a.e. (19,20,21)

The subdivision data for $Face_1$ [0] is derived from the second part of the first pair of subdivided edges, (10), the first part of the second pair of subdivided edges, (11), and the first additional edge, (19), thereby resulting in sub (10,11, 19).

The subdivision data for $Face_1$ [1] is derived from the second part of the second pair of subdivided edges, (12), the first part of the third pair of subdivided edges, (13), and the second additional edge, (20), thereby resulting in sub (12, 13,20).

The subdivision data for $Face_1$ [2] is derived from the second part of the third pair of subdivided edges, (14), the first part of the first pair of subdivided edges, (9), and the third additional edge, (21), thereby resulting in sub (14,9, 21).

Finally, the subdivision data for $Face_1$ [3] is derived from all three additional edges, (19,20,21), thereby resulting in sub (19,20,21).

Next, the two face bitflags for each subdivided edge are determined. The two face bitflags from an edge are carried over to its two subdivided edges. This is because subdividing an edge does not influence whether its two subdivided edges are doublesided or recycled, i.e., if an edge is doublesided, then its two subdivided edges are also doublesided after the subdivision. Hence, the second face bitflags for subdivided edges (13) and (14) are set to "d," since subdivided edges (13) and (14) are subdivided from edge (6) which is collectively used twice by $Face_0$ [0] and $Face_0$ [1]. As to the three additional edges, they are all used twice and recycled in the fourth subdivision face. Therefore, the two face bitflags for each additional edge are constant. The second face bitflags for the three additional edges, (19, 20,21), are set to "d," i.e., doublesided, when the three additional edges appear in $Face_1$ [0]–$Face_1$ [2], and are set to "r,d," i.e., doublesided and recycled, when the three additional edges appear in $Face_1$ [3].

The face information, subdivision data, and associated face bitflags after the first subdivision for $Face_1$ [0]–$Face_1$ [3] are derived as illustrated above. Likewise, the same information can be derived for $Face_1$ [4]–$Face_1$ [7].

For each subdivision step, after the face information and the subdivision data (including the associated face bitflags)

are obtained, new vertices then need to be generated. Generally, there are two types of vertices for subdivision purposes, namely, interior vertices and boundary/crease or exterior vertices. Subdivision rules for these two types of vertices are slightly different. As mentioned above, when subdividing, for each edge in the subdivision data, a vertex is created in the middle of an edge. How the vertex is generated depends on the vertex location. Different blending weights are used for different types of vertices. For example, if the vertex to be created is an interior vertex, the (3/8,3/8, 1/8,1/8) vertex weighting system is used; if the vertex to be created is an exterior vertex, the (½, ½) vertex weighting system is used. The method used to create the interior and exterior vertices will be described further below.

Figure 7:
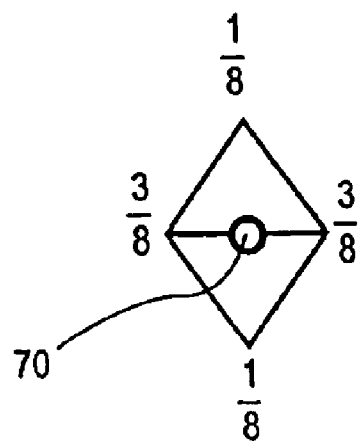
FIG. 7 is a diagram illustrating construction of interior vertices.

Referring to FIG. 7, interior vertices are located in the middle of a grid of vertices and typically share edges with six (6) other vertices. When constructing the interior vertex 70, different vertices are used differently; more specifically, 3/8 of each vertex on the edge and 1/8 per vertex that together with the edge forms a triangle.

Figure 8:
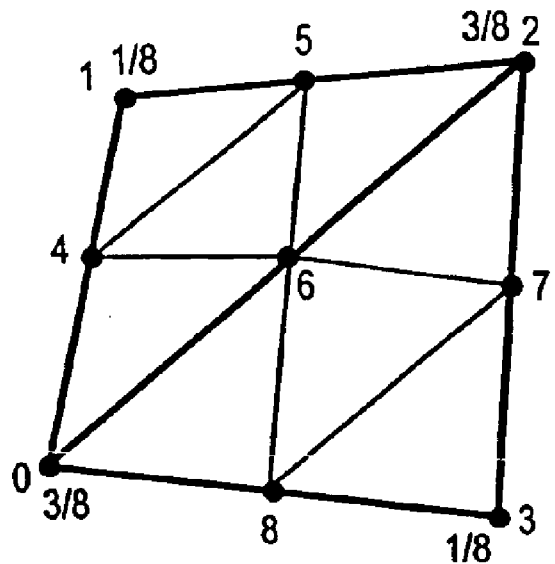
FIG. 8 is a diagram illustrating the blending weights used for constructing an interior vertex.

FIG. 8 illustrates the blending weights used for constructing an interior vertex. As shown in FIG. 8, vertex (6) which is to be generated is an interior vertex. Vertex (6) is constructed based on the following:

$$\text{vertex (6)} = 3/8 \text{ per neighbor vertex} + 1/8 \text{ per opposite vertex}$$

A neighbor vertex is an edge-sharing vertex, i.e., vertices (0,2), and an opposite vertex is the remaining triangle sharing vertex, i.e., vertices (1,3).

Figure 9:
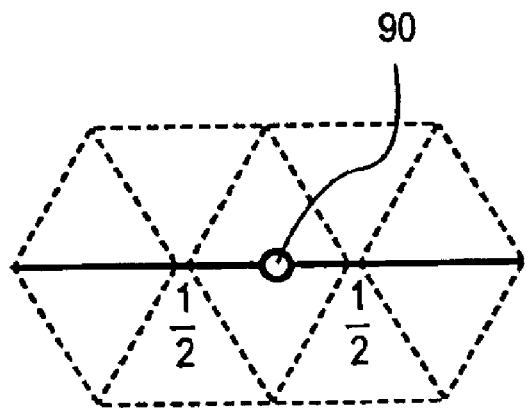
FIG. 9 is a diagram illustrating construction of boundary/crease or exterior vertices.

As shown in FIG. 9, edge (6) defined by vertices (0,2) is shared by two faces, namely, faces defined by vertices (0,1,2) and (0,2,3) respectively. Hence, the influence of vertices (0,2) on the created vertex should be halved, as these will be added twice.

Mathematically, vertex (6) is calculated as follows:

$$v_6 = (v_1 + v_3)/8 + (v_0 + v_2) * 3/8$$

But since vertices (0, 2) will be added twice due to the two faces, the influence of vertices (0,2) is halved as follows:

$$v_6 = (v_1 + v_3)/8 + (v_0 + v_2) * (3/8)/2$$
$$= (v_1 + v_3)/8 + (v_0 + v_2) * 3/16$$

The foregoing calculation effectively takes care of the problem with adding the same vertex twice. After processing Face [0], with regard to vertex (6), the following is obtained:

$$v_6 = v_1/8 + (v_0 + v_2) * 3/16$$

Subsequently, Face [1] is processed. It should be noted that Face [1] also contributes to vertex (6) since Face [1] shares edge (6) with Face [0]. Vertex (6) is then obtained as follows:

$$v_6 = (v_1/8 + (v_0 + v_2) * 3/16) + (v_3/8 + (v_0 + v_2) * 3/16)$$
$$= (v_1 + v_3)/8 + (v_0 + v_2) * 3/8$$

Referring to FIG. 9, when constructing a boundary/crease or exterior vertex 90, one-half (½) of each of the other boundary/crease edge vertices (solidly marked) is used. Constructing an exterior vertex is simpler than constructing an interior vertex. For an exterior vertex, by definition, the edge an exterior vertex lies on is used only by one face. Taking advantage of this face, an exterior vertex is then calculated by summing the two edge vertices and then dividing the result by two.

Figure 10:
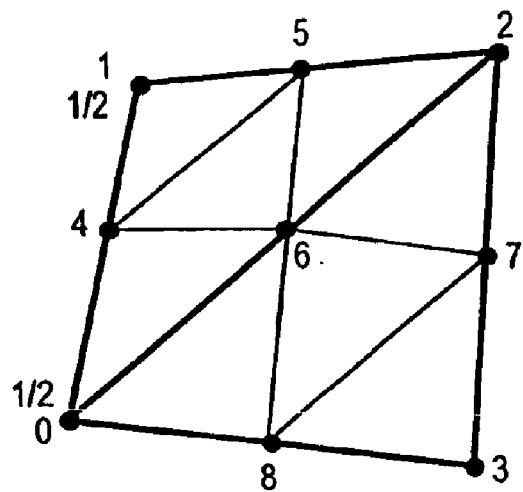
FIG. 10 is a diagram illustrating the blending weights used for constructing an exterior vertex.

As shown in FIG. 10, the blending weights for constructing vertex (4) are ½ per neighbor, since only one face is using edge (4). That is, one-half (½) of vertices (0,1) are added to create vertex (4) which is located in the middle of the edge (4). Edge (4) is a non-doublesided edge, i.e., it is used only by Face [0].

When creating a vertex for each edge, the vertex to be created is either an interior or exterior vertex. That is, the edge which the vertex lies on is either doublesided or non-doublesided. Depending on the nature of the vertex to be created, different blending weights are used. As described above, there are two face bitflags associated with each edge. The second face bitflag indicates whether an edge is doublesided. Hence, by using information contained in the second face bitflag for each edge, the proper blending weights to be used to create the vertex can be selected.

Furthermore, as mentioned above, there is an interior vertex bitflag associated with each vertex. The interior vertex bitflag is used to indicate whether a vertex is an interior vertex. To construct this interior vertex bitflag, the content of the second face bitflag is copied when subdividing an edge. If the subdivided edge is not doublesided, then such edge lies on a boundary or crease. Consequently, when subdividing, the created vertex in the middle of the subdivided edge also lies on the boundary or crease.

Using FIG. 6 as an example, the face information including the interior vertex bitflag is as follows:

Face$_1$ [0]: vertices (4,1,5)—sub (10,11,19$_d$)
Face$_1$ [1]: vertices (5,2,6$_i$)—sub (12,13$_d$,20$_d$)
Face$_1$ [2]: vertices (6$_i$,0,4)—sub (14$_d$,9,21$_d$)
Face$_1$ [3]: vertices (4,5,6$_i$)—sub (19$_{r,d}$,20$_{r,d}$,21$_{r,d}$)
Face$_1$ [4]: vertices (6$_i$,2,7)—sub (13$_{r,d}$,15,22$_d$)
Face$_1$ [5]: vertices (7,3,8)—sub (16,17,23$_d$)
Face$_1$ [6]: vertices (8,0,6$_i$)—sub (18,14$_{r,d}$,24$_d$)
Face$_1$ [7]: vertices (6$_i$,7,8)—sub (22$_{r,d}$,23$_{r,d}$,24$_{r,d}$)

The "i" indicates that a vertex is an interior vertex. The above is consistent with FIG. 6 which shows that vertex (6) is the only interior vertex. Typically, in larger meshes, most vertices are interior; and in closed meshes, all vertices are interior.

After the new vertices are generated for the edges, the existing vertices will be displaced. The loop surface subdivision method displaces (or moves) each existing vertex based on the surrounding vertices which share an edge with the existing vertex. Each output vertex (corresponding to the existing vertex which is displaced), if the corresponding existing vertex is an interior vertex, is influenced by the corresponding existing vertex and by each surrounding vertex by 1/16th.

Figure 11:
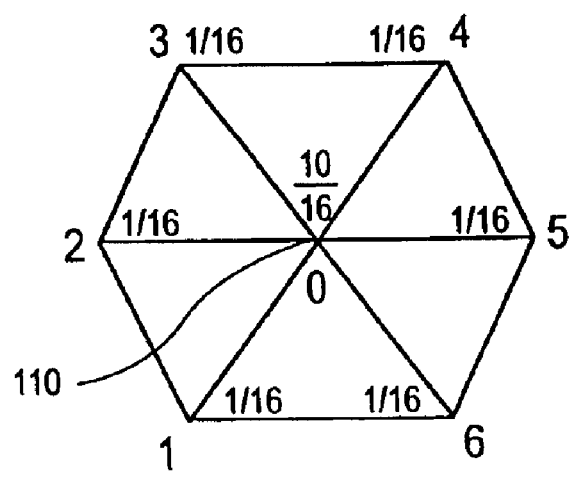
FIG. 11 is a diagram illustrating displacement of an interior vertex.

FIG. 11 illustrates the displacement of an existing interior vertex. As shown in FIG. 11, most vertices in a typical mesh are interior vertices with a valence of six (6). The output vertex (which corresponds to the displaced existing vertex (0) 110) is influenced by 10/16 of the existing vertex (0) 110 and by 1/16th of each surrounding vertex which shares an edge with the existing vertex (0) 110. In other words, the output vertex which corresponds to the displaced existing vertex (0) 110 includes 10/16 of the displaced existing vertex (0) 110 plus 1/16 per edge-sharing vertex (1,2,3,4,5,6).

Figures 12, 13:
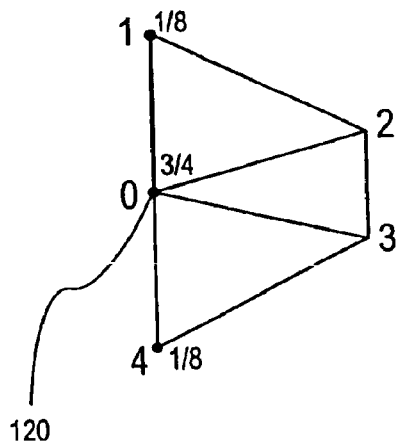
FIG. 12 is a diagram illustrating displacement of an exterior vertex.
FIG. 13 is a table showing indexing of blending weights using two bitflags in accordance with the present invention.

If the existing vertex to be displaced is a boundary/crease or exterior vertex, then the output vertex which corresponds to the existing vertex is affected only by other vertices on the boundary or crease. In this situation, the existing vertex is displaced as follows. FIG. 12 illustrates the displacement of an exterior vertex. FIG. 12 shows three faces, namely, Face 0: vertices (0,1,2), Face 1: vertices (0,2,3) and Face 2: vertices (0,3,4). Vertex (0) 120 is a boundary/crease vertex. Hence, the blending weights for the output vertex corresponding to the displaced vertex (0) 120 are ⅛ per neighbor and ¾ of vertex (0) 120.

Referring to FIG. 12, there is shown a mesh with five (5) vertices (0,1,2,3,4). The output vertex which corresponds to the displaced vertex (0) 120 is influenced by vertices (1,4) and vertex (0) 120. Since vertex (0) 120 is on a boundary, vertex (0) 120 shares a boundary with vertices (1,4). As indicated above, the blending weights for the output vertex are ⅛ per neighbor (or per boundary-sharing vertex) and 6/8 of the displaced vertex (0) 120. In one exemplary implementation, as shown in FIG. 13, the interior vertex bitflag and the second face bitflag (the "doublesided" bitflag) are used to index an array with blending weights.

To complete displacement of the existing vertices where the existing vertices are exterior, the existing vertices are first copied into an output vertex array. Then, for each blending step, each output vertex is calculated by adding the appropriate blending weight times vertex minus existing vertex as follows:

$$v_{out} = v_{out} + \text{weight} * (v_x - v_{src})$$

where $v_{out}$ is the output (or displaced) vertex, $v_{src}$ is the existing (or undisplaced) vertex, and $v_x$ is an edge-sharing vertex. The foregoing means that a fraction of the existing vertex is removed while the same fraction of the edging-sharing vertex is blended in.

Based on the disclosure provided herein, it should be apparent to one of ordinary skill in the art that the exemplary methods of the present invention can be implemented to generate subdivision surfaces in a more efficient and real-time manner. The face information and subdivision data as described above represent a relatively small amount of data thereby allowing such information and data to be stored in a minimal amount of storage space and processed more efficiently and in a real-time manner.

In an exemplary implementation, an exemplary method of the present invention is implemented using graphics development software, such as Direct3D by Microsoft, and/or computer programming languages, such as C and C++. The exemplary implementation can be designed in an integrated manner or a modular manner having various modules. The exemplary implementation can reside on, for example, a computer readable medium such as a CD or DVD. An exemplary software embodiment illustrating data structures for the face information and subdivision data including various bitflags is provided in Table 1 below:

TABLE 1

```
struct SVertex
{
    float              x,y,z;
};
struct SFace
{
    unsigned short     vertexIndex[3];
};
struct SSubFace : public SFace
{
    unsigned char      edgeRecycle[3] : 1,
                       edgeDoublesided[3] : 1;
    unsigned char      vertexInterior[3] : 1;
};
```

TABLE 1-continued

```
struct SPrimitive
{
    int                faces, vertices;
    SFace              *faceData;
    SSubFace           *subData;
    SVertex            *vertexData;
};
```

It should be understood that the present invention can also be implemented using hardware. Such hardware may be an integrated circuit or chip which resides in a video game machine or a graphics card for use with a computer. Control logic, for example, in the form of microcode or microprogramming instructions, can be used to control such hardware. A combination of software and hardware can also be used to implement the present invention. Based on the disclosure provided herein, a person of ordinary skill in the art will know of other ways and/or methods to realize and implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for generating a plurality of subdivision surfaces from a subdivided face, comprising:

generating a first set of face information and a first set of subdivision data for the subdivided face, wherein the first sets of face information and subdivision data respectively include a plurality of vertices and a plurality of edges;

generating a plurality of subdivided edges and a plurality of additional edges using the first set of subdivision data;

defining each edge from the plurality of edges by using a pair of subdivided edges in a first order, wherein if an edge is used twice and is being used for a second time, the pair of subdivided edges defining the edge is re-arranged in a second order which is a reverse of the first order;

generating a second set of face information for each of the plurality of subdivision surfaces using the first sets of face information and subdivision data;

generating a second set of subdivision data for each of the plurality of subdivision surfaces using the plurality of subdivided edges and the plurality of additional edges;

generating a vertex for each one of the plurality of edges; and displacing the plurality of vertices and the vertices generated for the plurality of edges.

2. The method of claim 1 wherein the step of generating the vertex for each one of the plurality of edges further comprises:

if the vertex is an interior vertex and a (⅜,⅜,⅛,⅛) vertex weighting system is used, dividing a blending weight for an edge-sharing vertex in half.

3. The method of claim 1 wherein information relating to whether the edge is used twice and is being used for the second time is respectively stored in a first and second bitflags associated with the edge.

4. The method of claim 3 wherein the step of generating the vertex for each one of the plurality of edges further comprises:
   determining whether the vertex to be generated is an interior or exterior vertex by using the information stored in the first bitflag.

5. The method of claim 1 wherein:
   the plurality of vertices includes a first vertex, a second vertex and a third vertex;
   the plurality of edges includes a first edge, a second edge and a third edge; and
   the step of generating the second set of face information further comprises:
      deriving face information for a first subdivision surface by using the first edge, the second vertex and the second edge;
      deriving face information for a second subdivision surface by using the second edge, the third vertex and the third edge;
      deriving face information for a third subdivision surface by using the third edge, the first vertex and the first edge; and
      deriving face information for a fourth subdivision surface by using the first edge, the second edge and the third edge.

6. The method of claim 5 wherein:
   the plurality of subdivided edges includes a first pair of subdivided edges which make up the first edge, a second pair of subdivided edges which make up the second edge, and a third pair of subdivided edges which make up the third edge;
   the plurality of additional edges includes a first additional edge, a second additional edge and a third additional edge; and
   the step of generating the second set of subdivision data further comprises:
      deriving subdivision data for the first subdivision surface by using the second of the first pair of subdivided edges, the first of the second pair of subdivided edges, and the first additional edge;
      deriving subdivision data for the second subdivision surface by using the second of the second pair of subdivided edges, the first of the third pair of subdivided edges, and the second additional edge;
      deriving subdivision data for the third subdivision surface by using the second of the third pair of subdivided edges, the first of the first pair of subdivided edges, and the third additional edge; and
      deriving subdivision data for the fourth subdivision surface by using the first, second and third additional edges.

7. The method of claim 1 wherein the second sets of face information and subdivision data respectively include a plurality of vertices and edges defining the associated subdivision surface.

8. The method of claim 1 wherein the method is implemented using computer software.

9. The method of claim 8 wherein the method is performed in real-time thereby allowing the plurality of subdivision surfaces to be generated in real-time.

10. The method of claim 8 wherein the method implemented using computer software is stored on a computer readable medium.

11. A system for generating a plurality of subdivision surfaces from a subdivided face, comprising:
   a module configured to generate a first set of face information and a first set of subdivision data for the subdivided face, wherein the first sets of face information and subdivision data respectively include a plurality of vertices and a plurality of edges;
   a module configured to generate a plurality of subdivided edges and a plurality of additional edges using the first set of subdivision data;
   a module configured to define each edge from the plurality of edges by using a pair of subdivided edges in a first order, wherein if an edge is used twice and is being used for a second time, the pair of subdivided edges defining the edge is re-arranged in a second order which is a reverse of the first order;
   a module configured to generate a second set of face information for each of the plurality of subdivision surfaces using the first sets of face information and subdivision data;
   a module configured to generate a second set of subdivision data for each of the plurality of subdivision surfaces using the plurality of subdivided edges and the plurality of additional edges;
   a module configured to generate a vertex for each one of the plurality of edges; and
   a module configured to displace the plurality of vertices and the vertices generated for the plurality of edges.

12. The system of claim 11 wherein the module configured to generate the vertex for each one of the plurality of edges further comprises:
   a module configured to divide a blending weight for an edge-sharing vertex in half if the vertex is an interior vertex and a $(3/8, 3/8, 1/8, 1/8)$ vertex weighting system is used.

13. The system of claim 11 wherein information relating to whether the edge is used twice and is being used for the second time is respectively stored in a first and second bitflags associated with the edge.

14. The system of claim 13 wherein the module configured to generate the vertex for each one of the plurality of edges further comprises:
   a module configured to determine whether the vertex to be generated is an interior or exterior vertex by using the information stored in the first bitflag.

15. The system of claim 11 wherein:
   the plurality of vertices includes a first vertex, a second vertex and a third vertex;
   the plurality of edges includes a first edge, a second edge and a third edge; and
   the module configured to generate the second set of face information further comprises:
      a module configured to derive face information for a first subdivision surface by using the first edge, the second vertex and the second edge;
      a module configured to derive face information for a second subdivision surface by using the second edge, the third vertex and the third edge;
      a module configured to derive face information for a third subdivision surface by using the third edge, the first vertex and the first edge; and
      a module configured to derive face information for a fourth subdivision surface by using the first edge, the second edge and the third edge.

16. The system of claim 15 wherein:
   the plurality of subdivided edges includes a first pair of subdivided edges which make up the first edge, a second pair of subdivided edges which make up the second edge, and a third pair of subdivided edges which make up the third edge;

the plurality of additional edges includes a first additional edge, a second additional edge and a third additional edge; and the module configured to generate the second set of subdivision data further comprises:

a module configured to derive subdivision data for the first subdivision surface by using the second of the first pair of subdivided edges, the first of the second pair of subdivided edges, and the first additional edge;

a module configured to derive subdivision data for the second subdivision surface by using the second of the second pair of subdivided edges, the first of the third pair of subdivided edges, and the second additional edge;

a module configured to derive subdivision data for the third subdivision surface by using the second of the third pair of subdivided edges, the first of the first pair of subdivided edges, and the third additional edge; and a module configured to derive subdivision data for the fourth subdivision surface by using the first, second and third additional edges.

17. The system of claim 11 wherein the second sets of face information and subdivision data respectively include a plurality of vertices and edges defining the associated subdivision surface.

18. The system of claim 11 wherein the system is implemented using computer software.

19. The system of claim 18 wherein the system is run in real-time thereby allowing the plurality of subdivision surfaces to be generated in real-time.

20. The system of claim 18 wherein the system implemented using computer software is stored on a computer readable medium.

21. A computer readable medium having stored thereon instructions configured to cause generation of a plurality of subdivision surfaces from a subdivided face, comprising:

a set of instructions configured to generate a first set of face information and a first set of subdivision data for the subdivided face, wherein the first sets of face information and subdivision data respectively include a plurality of vertices and a plurality of edges;

a set of instructions configured to generate a plurality of subdivided edges and a plurality of additional edges using the first set of subdivision data;

a set of instructions configured to define each edge from the plurality of edges by using a pair of subdivided edges in a first order, wherein if an edge is used twice and is being used for a second time, the pair of subdivided edges defining the edge is re-arranged in a second order which is a reverse of the first order;

a set of instructions configured to generate a second set of face information for each of the plurality of subdivision surfaces using the first sets of face information and subdivision data;

a set of instructions configured to generate a second set of subdivision data for each of the plurality of subdivision surfaces using the plurality of subdivided edges and the plurality of additional edges;

a set of instructions configured to generate a vertex for each one of the plurality of edges; and a set of instructions configured to displace the plurality of vertices and the vertices generated for the plurality of edges.

22. The computer readable medium of claim 21 wherein the set of instructions configured to generate the vertex for each one of the plurality of edges further comprises:

a set of instructions configured to divide a blending weight for an edge-sharing vertex in half if the vertex is an interior vertex and a ($3/8,3/8,1/8,1/8$) vertex weighting system is used.

23. The computer readable medium of claim 21 wherein information relating to whether the edge is used twice and is being used for the second time is respectively stored in a first and second bitflags associated with the edge.

24. The computer readable medium of claim 23 wherein the set of instructions configured to generate the vertex for each one of the plurality of edges further comprises:

a set of instructions configured to determine whether the vertex to be generated is an interior or exterior vertex by using the information stored in the first bitflag.

25. The computer readable medium of claim 21 wherein:

the plurality of vertices includes a first vertex, a second vertex and a third vertex;

the plurality of edges includes a first edge, a second edge and a third edge; and the set of instructions configured to generate the second set of face information further comprises:

a set of instructions configured to derive face information for a first subdivision surface by using the first edge, the second vertex and the second edge;

a set of instructions configured to derive face information for a second subdivision surface by using the second edge, the third vertex and the third edge;

a set of instructions configured to derive face information for a third subdivision surface by using the third edge, the first vertex and the first edge; and a set of instructions configured to derive face information for a fourth subdivision surface by using the first edge, the second edge and the third edge.

26. The computer readable medium of claim 25 wherein:

the plurality of subdivided edges includes a first pair of subdivided edges which make up the first edge, a second pair of subdivided edges which make up the second edge, and a third pair of subdivided edges which make up the third edge;

the plurality of additional edges includes a first additional edge, a second additional edge and a third additional edge; and the set of instructions configured to generate the second set of subdivision data further comprises:

a set of instructions configured to derive subdivision data for the first subdivision surface by using the second of the first pair of subdivided edges, the first of the second pair of subdivided edges, and the first additional edge;

a set of instructions configured to derive subdivision data for the second subdivision surface by using the second of the second pair of subdivided edges, the first of the third pair of subdivided edges, and the second additional edge;

a set of instructions configured to derive subdivision data for the third subdivision surface by using the second of the third pair of subdivided edges, the first of the first pair of subdivided edges, and the third additional edge; and a set of instructions configured to derive subdivision data for the fourth subdivision surface by using the first, second and third additional edges.

27. The computer readable medium of claim 21 wherein the second sets of face information and subdivision data respectively include a plurality of vertices and edges defining the associated subdivision surface.

28. The computer readable medium of claim 21 wherein the instructions residing on the computer readable medium are executed in real-time thereby allowing the plurality of subdivision surfaces to be generated in real-time.

29. The computer readable medium of claim 21 wherein the computer readable medium is a compact disc or a digital video disc.

30. An integrated circuit having a plurality of components configured to generate a plurality of subdivision surfaces from a subdivided face, comprising:
 a component configured to generate a first set of face information and a first set of subdivision data for the subdivided face, wherein the first sets of face information and subdivision data respectively include a plurality of vertices and a plurality of edges;
 a component configured to generate a plurality of subdivided edges and a plurality of additional edges using the first set of subdivision data;
 a component configured to define each edge from the plurality of edges by using a pair of subdivided edges in a first order, wherein if an edge is used twice and is being used for a second time, the pair of subdivided edges defining the edge is re-arranged in a second order which is a reverse of the first order;
 a component configured to generate a second set of face information for each of the plurality of subdivision surfaces using the first sets of face information and subdivision data;
 a component configured to generate a second set of subdivision data for each of the plurality of subdivision surfaces using the plurality of subdivided edges and the plurality of additional edges;
 a component configured to generate a vertex for each one of the plurality of edges; and
 a component configured to displace the plurality of vertices and the vertices generated for the plurality of edges.

31. The integrated circuit of claim 30 wherein the component configured to generate the vertex for each one of the plurality of edges further comprises:
 a component configured to divide a blending weight for an edge-sharing vertex in half if the vertex is an interior vertex and a ($3/8,3/8,1/8,1/8$) vertex weighting system is used.

32. The integrated circuit of claim 30 wherein information relating to whether the edge is used twice and is being used for the second time is respectively stored in a first and second bitflags associated with the edge.

33. The integrated circuit of claim 32 wherein the component configured to generate the vertex for each one of the plurality of edges further comprises:
 a component configured to determine whether the vertex to be generated is an interior or exterior vertex by using the information stored in the first bitflag.

34. The integrated circuit of claim 30 wherein:
 the plurality of vertices includes a first vertex, a second vertex and a third vertex;
 the plurality of edges includes a first edge, a second edge and a third edge; and
 the component configured to generate the second set of face information further comprises:
  a component configured to derive face information for a first subdivision surface by using the first edge, the second vertex and the second edge;
  a component configured to derive face information for a second subdivision surface by using the second edge, the third vertex and the third edge;
  a component configured to derive face information for a third subdivision surface by using the third edge, the first vertex and the first edge; and
  a component configured to derive face information for a fourth subdivision surface by using the first edge, the second edge and the third edge.

35. The integrated circuit of claim 34 wherein:
 the plurality of subdivided edges includes a first pair of subdivided edges which make up the first edge, a second pair of subdivided edges which make up the second edge, and a third pair of subdivided edges which make up the third edge;
 the plurality of additional edges includes a first additional edge, a second additional edge and a third additional edge; and
 the component configured to generate the second set of subdivision data further comprises:
  a component configured to derive subdivision data for the first subdivision surface by using the second of the first pair of subdivided edges, the first of the second pair of subdivided edges, and the first additional edge;
  a component configured to derive subdivision data for the second subdivision surface by using the second of the second pair of subdivided edges, the first of the third pair of subdivided edges, and the second additional edge;
  a component configured to derive subdivision data for the third subdivision surface by using the second of the third pair of subdivided edges, the first of the first pair of subdivided edges, and the third additional edge; and
  a component configured to derive subdivision data for the fourth subdivision surface by using the first, second and third additional edges.

36. The integrated circuit of claim 30 wherein the second sets of face information and subdivision data respectively include a plurality of vertices and edges defining the associated subdivision surface.

37. The integrated circuit of claim 30 wherein the plurality of components residing on the integrated circuit are executed in real-time thereby allowing the plurality of subdivision surfaces to be generated in real-time.

38. The integrated circuit of claim 30 wherein the plurality of components are implemented using control logic or hardware or a combination of both.

39. A video game machine having the integrated circuit of claim 30.

40. A graphics card having the integrated circuit of claim 30.

* * * * *